United States Patent
Hsieh et al.

(10) Patent No.: US 11,631,195 B2
(45) Date of Patent: Apr. 18, 2023

(54) INDOOR POSITIONING SYSTEM AND INDOOR POSITIONING METHOD

(71) Applicant: NATIONAL TAIWAN UNIVERSITY, Taipei (TW)

(72) Inventors: Shang-Hsien Hsieh, Taipei (TW); Bo-Kai Huang, Taichung (TW); Wei-Liang Kuo, Taipei (TW)

(73) Assignee: NATIONAL TAIWAN UNIVERSITY, Taipei (TW)

( * ) Notice: Subject to any disclaimer, the term of this patent is extended or adjusted under 35 U.S.C. 154(b) by 85 days.

(21) Appl. No.: 17/378,778

(22) Filed: Jul. 19, 2021

(65) Prior Publication Data
US 2022/0301222 A1    Sep. 22, 2022

(30) Foreign Application Priority Data
Mar. 19, 2021    (TW) ................................. 110109945

(51) Int. Cl.
*G06T 7/73*    (2017.01)
*G06T 7/246*    (2017.01)
(Continued)

(52) U.S. Cl.
CPC ............... *G06T 7/75* (2017.01); *G01C 19/00* (2013.01); *G01P 15/08* (2013.01); *G01P 15/18* (2013.01);
(Continued)

(58) Field of Classification Search
CPC .... G06T 7/70; G06T 7/73; G06T 7/75; G06T 7/248; G06T 2207/20081;
(Continued)

(56) References Cited

U.S. PATENT DOCUMENTS

2018/0330393 A1\*  11/2018  Lipkowitz .......... G06Q 30/0236
2021/0232858 A1\*   7/2021  Mukherjee ................ G06T 7/70
(Continued)

FOREIGN PATENT DOCUMENTS

CN    110399641 A    11/2019
CN    111309942 B    11/2020
(Continued)

OTHER PUBLICATIONS

Laskar, Zakaria, et al. "Camera relocalization by computing pairwise relative poses using convolutional neural network." Proceedings of the IEEE International Conference on Computer Vision Workshops (Year: 2017).\*
(Continued)

*Primary Examiner* — Diane M Wills
(74) *Attorney, Agent, or Firm* — Li & Cai Intellectual Property Office

(57) ABSTRACT

An indoor positioning system and method are provided. The indoor positioning method includes: establishing an image database through a BIM model of a target area, and using a trained deep learning model to extract features of a virtual image; after obtaining a captured image in the target area, using the trained deep learning model to extract features thereof, and performing similarity matching with the image database to calculate a spatial position of a most similar image; calculating the most similar image and its essential matrix through multiple sets of feature points, and obtaining capturing positions and capturing pose parameters as positioning results; projecting the BIM model to a tracking captured image, and updating the positioning results and the capturing pose parameters with a visual inertial odometer; and continuously correcting the positioning results and the capturing pose parameters by detecting horizontal and vertical planes from the tracking captured image.

9 Claims, 13 Drawing Sheets

(51) Int. Cl.
*G06V 10/75* (2022.01)
*G06T 15/20* (2011.01)
*G06T 17/00* (2006.01)
*G06N 3/04* (2023.01)
*G06N 3/08* (2023.01)
*G01P 15/08* (2006.01)
*G01P 15/18* (2013.01)
*G01C 19/00* (2013.01)
*G06V 10/40* (2022.01)
*G06V 10/74* (2022.01)
*G06F 18/22* (2023.01)

(52) U.S. Cl.
CPC ............... *G06F 18/22* (2023.01); *G06N 3/04* (2013.01); *G06N 3/08* (2013.01); *G06T 7/248* (2017.01); *G06T 15/20* (2013.01); *G06T 17/00* (2013.01); *G06V 10/40* (2022.01); *G06V 10/751* (2022.01); *G06V 10/761* (2022.01); *G06T 2207/10028* (2013.01); *G06T 2207/20081* (2013.01); *G06T 2207/20084* (2013.01); *G06T 2207/30244* (2013.01)

(58) Field of Classification Search
CPC .. G06T 2207/20084; G06N 3/02; G06N 3/04; G06N 3/08
See application file for complete search history.

(56) References Cited

U.S. PATENT DOCUMENTS

2022/0224833 A1* 7/2022 Cier .................... H04N 5/23238
2022/0284609 A1* 9/2022 Shree ........................ G06T 7/33

FOREIGN PATENT DOCUMENTS

EP 3680813 A1 7/2020
TW M607740 U 2/2021

OTHER PUBLICATIONS

Shavit Y, Ferens R. Do We Really Need Scene-specific Pose Encoders?. In2020 25th International Conference on Pattern Recognition (ICPR) Jan. 10, 2021 (pp. 3186-3192). IEEE. (Year: 2021).*

* cited by examiner

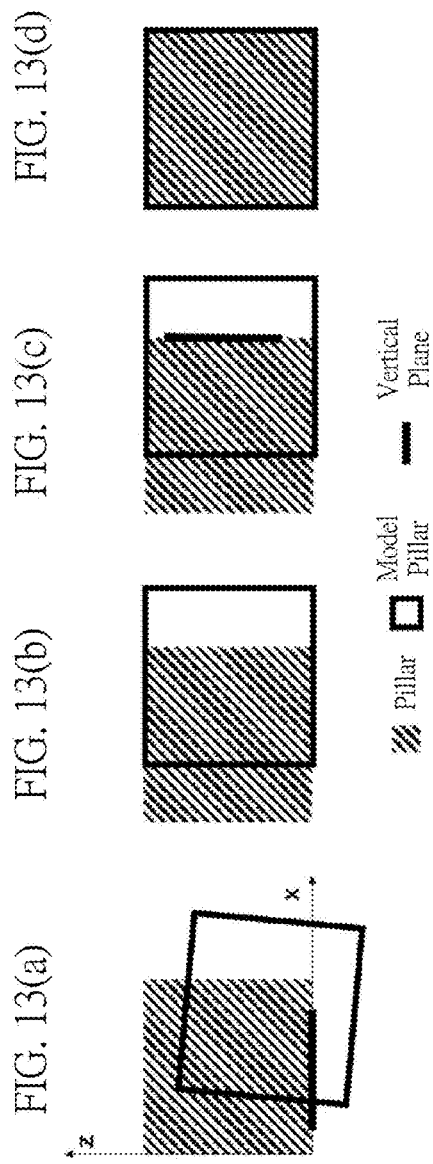

INDOOR POSITIONING SYSTEM AND INDOOR POSITIONING METHOD

CROSS-REFERENCE TO RELATED PATENT APPLICATION

This application claims the benefit of priority to Taiwan Patent Application No. 110109945, filed on Mar. 19, 2021. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to an indoor positioning system and an indoor positioning method, and more particularly to an indoor positioning system and an indoor positioning method used for indoor positioning at a construction site.

BACKGROUND OF THE DISCLOSURE

With the development of construction site automation, there is an increased demand for indoor positioning. In the existing indoor positioning technologies, methods that include using RFID, Wi-Fi, broadband, and computer vision have all reached maturity. However, due to the lack of telecommunications, network and other equipment in a construction site, many indoor positioning methods developed through broadband, WIFI and other communication equipment cannot be easily implemented.

For example, in an early stage of a construction project, an environment of the construction site is not yet furnished with a complete set of network equipment so that it can be difficult to address issues concerning indoor positioning through the above-mentioned technologies.

On the other hand, in an indoor construction site, since the global navigation satellite system (GNSS) cannot receive satellite signals in the indoor environment, the commonly used positioning method, such as that using the global positioning system (GPS), is unable to be performed accurately.

Therefore, there is an urgent need for an indoor positioning system and an indoor positioning method for indoor positioning at the construction site.

SUMMARY OF THE DISCLOSURE

In response to the above-referenced technical inadequacies, the present disclosure provides an indoor positioning system and an indoor positioning method for indoor positioning at a construction site.

In one aspect, the present disclosure provides an indoor positioning method, and the indoor positioning method includes: configuring a computing device to obtain a Building Information Modeling (BIM) model of a target area; configuring the computing device to generate at least one virtual camera, control at least one virtual camera to obtain a plurality of virtual images in the BIM model, a plurality of camera positions and a plurality of camera pose parameters corresponding to the plurality of virtual images, and store the plurality of virtual images, the plurality of camera positions and the plurality of camera pose parameters in an image database; configuring the computing device to input the plurality of virtual images into a trained deep learning network to perform image feature extractions on the plurality of virtual images to obtain a plurality of virtual image features corresponding to the plurality of virtual images; configuring an image capturing device to obtain a captured image at a current position in the target area; configuring the computing device to input the captured image into the trained deep learning network, so as to perform the image feature extraction on the captured image and to obtain a captured image feature corresponding to the captured image; configuring the computing device to execute a similarity matching algorithm on the captured image feature and the plurality of virtual image features to obtain a plurality of matching virtual images with relatively high similarity to the captured image from the plurality of virtual images; configuring the computing device to display the plurality of matching virtual images on a user interface for a user to select a most similar image; configuring the computing device to display the captured image and the most similar image on the user interface for the user to select a plurality of sets of corresponding feature points from the captured image and the most similar image; configuring the computing device to: obtain, from the plurality of virtual images, the nearest image having the virtual image feature with the highest similarity to the virtual image feature of the most similar image; obtain a plurality of sets of corresponding feature point coordinates of the plurality of sets of feature points; calculate a capturing position and a capturing pose parameter of the image capturing device upon obtaining the captured image according to a geometric relationship between the captured image and the most similar image, a geometric relationship between the most similar image and the nearest image, and the plurality of sets of corresponding feature point coordinates; and take the capturing position as a positioning result representing the current position.

In another aspect, the present disclosure provides an indoor positioning system including a computing device, an image capturing device and a user interface. The computing device includes at least one processor and a storage unit, and the computing device is configured to: obtain a building information modeling (BIM) model of a target area; generate at least one virtual camera, and control the at least one virtual camera to obtain a plurality of virtual images in the BIM model, a plurality of camera positions and a plurality of camera pose parameters corresponding to the plurality of virtual images, and store the plurality of virtual images, the plurality of camera positions and the plurality of camera pose parameters in an image database; and input the plurality of virtual images into a trained deep learning network to perform image feature extractions on the plurality of virtual images to obtain a plurality of virtual image features corresponding to the plurality of virtual images. The image capturing device is electrically connected to the computing device, and is configured to obtain a captured image at a current position in the target area. The user interface is electrically connected to the computing device. The computing device is further configured to: input the captured image into the trained deep learning network to perform the image feature extraction on the captured image to obtain a captured image feature corresponding to the captured image; execute a similarity matching algorithm on the captured image feature and the plurality of virtual image features to obtain a plurality of matching virtual images with relatively high similarity to the captured image from the plurality of virtual images; display the plurality of matching virtual images on the user interface for the user to select a most similar image; display the captured image and the most similar image on the user interface for the user to select a plurality of sets of corresponding feature points from the captured image and the most similar image; obtain, from the plurality of virtual images, a nearest image having the virtual image feature with the highest similarity to the virtual image feature of the most similar image; obtain a plurality of sets of corresponding feature point coordinates of the plurality of sets of feature points; calculate a capturing position and a capturing pose parameter when the image capturing device obtaining the captured image according to a geometric relationship between the captured image and the most similar image, a geometric relationship between the most similar image and the nearest image, and the plurality of sets of corresponding feature point coordinates; and take the capturing position as a positioning result representing the current position.

Therefore, the indoor positioning method and the indoor positioning system provided by the present disclosure can overcome a limitation that a real image database cannot be established at the construction site, and import semi-automatic methods when using feature extraction methods based on deep learning models, so as to allow the users to select the correct similar image. In this way, a situation in which a position cannot be determined due to repetitive and symmetrical structures can be solved. In addition, the users are enabled to manually match the plurality of feature points from the plurality of virtual images and the captured image that is filtered by the deep learning network, such that accurate positioning can be achieved.

Furthermore, the indoor positioning method and the indoor positioning system of the present disclosure further introduce a concept of simultaneous localization and mapping (SLAM) to avoid excessive manual positioning assistance. After the positioning is completed in the first three steps, a starting point information is provided to the user, and then visual-inertial odometry (VIO) is used to calculate a relative position. In addition, due to an error of the VIO, the BIM model is template matched for instant correction, so as to address an issue of accumulated errors.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which:

FIGS. 13(a) to 13(d) are schematic diagrams in which pillar elements and model pillars in a target area are used to demonstrate correction of the projection model by use of a detected vertical plane according to an embodiment of the present disclosure.

DETAILED DESCRIPTION OF THE EXEMPLARY EMBODIMENTS

Figure 1:
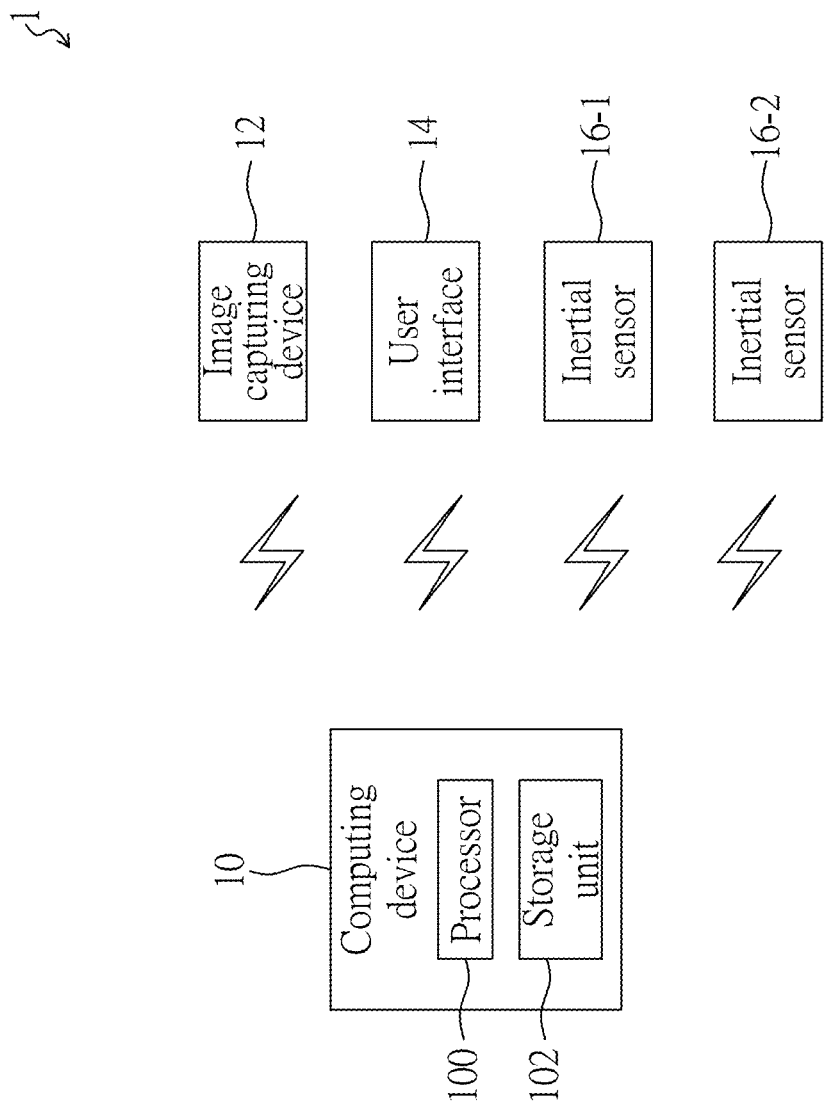
FIG. 1 is a functional block diagram of an indoor positioning system according to one embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

FIG. 1 is a functional block diagram of an indoor positioning system according to an embodiment of the present disclosure. Referring to FIG. 1, a first embodiment of the present disclosure provides an indoor positioning system 1, which includes a computing device 10, an image capturing device 12, a user interface 14, and inertial sensors 16-1 and 16-2.

The computing device 10 includes a processor 100 and a storage unit 102. The computing device 10 can include any suitable processor-driven computing device, which includes, but is not limited to, desktop computing devices, laptop computing devices, servers, smartphones, tablet computers and the like. A processing unit 104 can be an integrated circuit (such as a programmable logic control circuit, a micro-processor circuit or a micro-control circuit), a central processing unit, and the like, or can include the aforementioned electronic devices (such as integrated circuit tablets, mobile phones, notebook computers or desktop computers), but the present disclosure is not limited thereto. Furthermore, the storage unit 102 may be, for example, a memory system, which can include a non-volatile memory (such as flash memory) and a system memory (such as DRAM).

The image capturing device 12 can be, for example, a camera or video camera that includes a lens module and a photosensitive element that can be used to capture images. The inertial sensors 16-1 and 16-2 can be a gyroscope and an acceleration sensor, respectively. The gyroscope can be used to obtain three-axis rotation and angular acceleration, and the acceleration sensor can be used to obtain three-dimensional acceleration.

Furthermore, the user interface 14 can be, for example, a touch-sensitive display capable of simultaneously displaying information and receiving user input (such as a liquid crystal display, an LED display, or an OLED display), and may also include peripheral devices (such as a keyboard and a mouse) for a user to input commands, but the present disclosure is not limited thereto.

It should be noted that, in a specific embodiment, the computing device 10, the image capturing device 12, the user interface 14, and the inertial sensors 16-1, 16-2 can be connected to each other in a wired or wireless manner, and can be included in a mobile device for implementing an indoor positioning method of the present disclosure, such as a smartphone, a tablet computer, a notebook computer, and the like.

It should be noted that the indoor positioning method of the present disclosure can be applied to the aforementioned indoor positioning system 1, but the present disclosure is not limited thereto. The indoor positioning method of the present disclosure is roughly divided into four main links hereinafter, namely (a) establishment of building information modeling (BIM) image database, (b) spatial similarity matching, (c) camera position and pose evaluation, and (d) visual inertial odometry (VIO).

Figure 2:
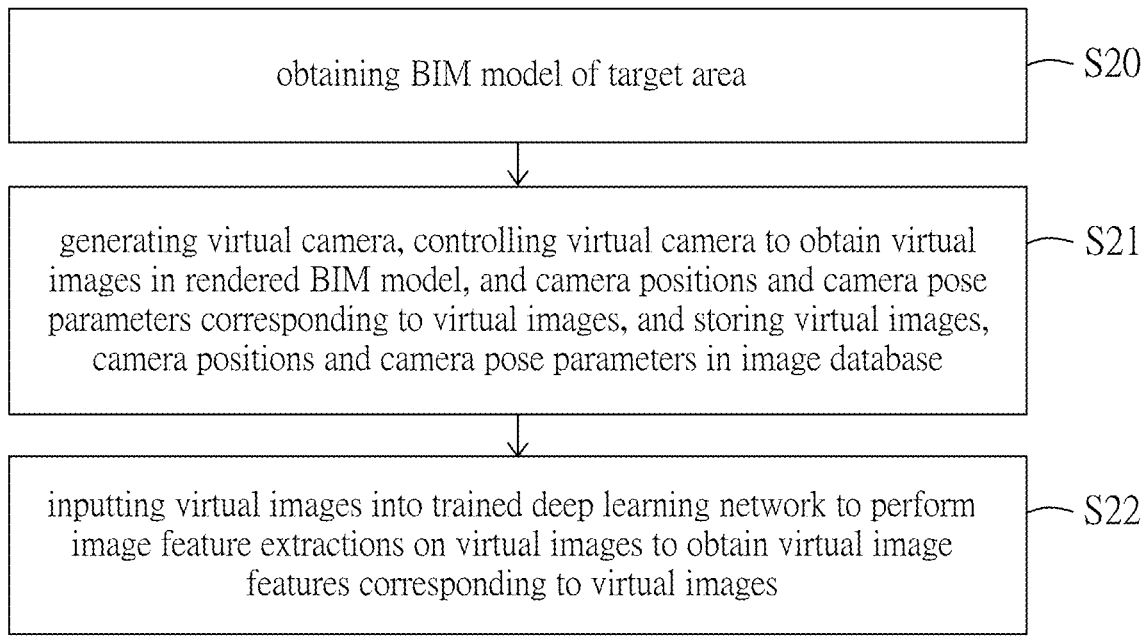
FIG. 2 is a flowchart of steps for establishing a BIM image database according to an embodiment of the present disclosure.

Reference can be made to FIG. 2, which is a flowchart of steps for establishing a BIM image database according to an embodiment of the present disclosure. In detail, this step is used to establish a database required for subsequent spatial matching and camera position and pose evaluation. Since the environment of a construction site is changeable, the database established by using real images will not be sufficient as the construction progresses. Therefore, by establishing the BIM image database, the present disclosure can not only use a BIM model to simulate the scene and environment as much as possible, but also quickly establish the database in an automated manner. As shown in FIG. 2, the steps for establishing the BIM image database include:

Step S20: obtaining a BIM model of a target area. The target area can be, for example, a building under construction. The BIM model uses various related information data of a construction project as the basis of modeling, and a model of the building is established by simulating real information of the building through digital information.

Step S21: generating a virtual camera, controlling the virtual camera to obtain a plurality of virtual images in the rendered BIM model, and a plurality of camera positions and a plurality of camera pose parameters corresponding to the plurality of virtual images, and storing the plurality of virtual images, the plurality of camera positions and the plurality of camera pose parameters in an image database.

For example, in this step, the virtual cameras are placed in a plurality of spaces in the BIM model to obtain a plurality of rendered virtual images. While the plurality of virtual images are stored, positions and poses of the virtual camera when the plurality of virtual images are obtained and are stored as one record of information.

Step S22: inputting the plurality of virtual images into a trained deep learning network to perform image feature extractions on the plurality of virtual images to obtain a plurality of virtual image features corresponding to the plurality of virtual images.

Figure 3:
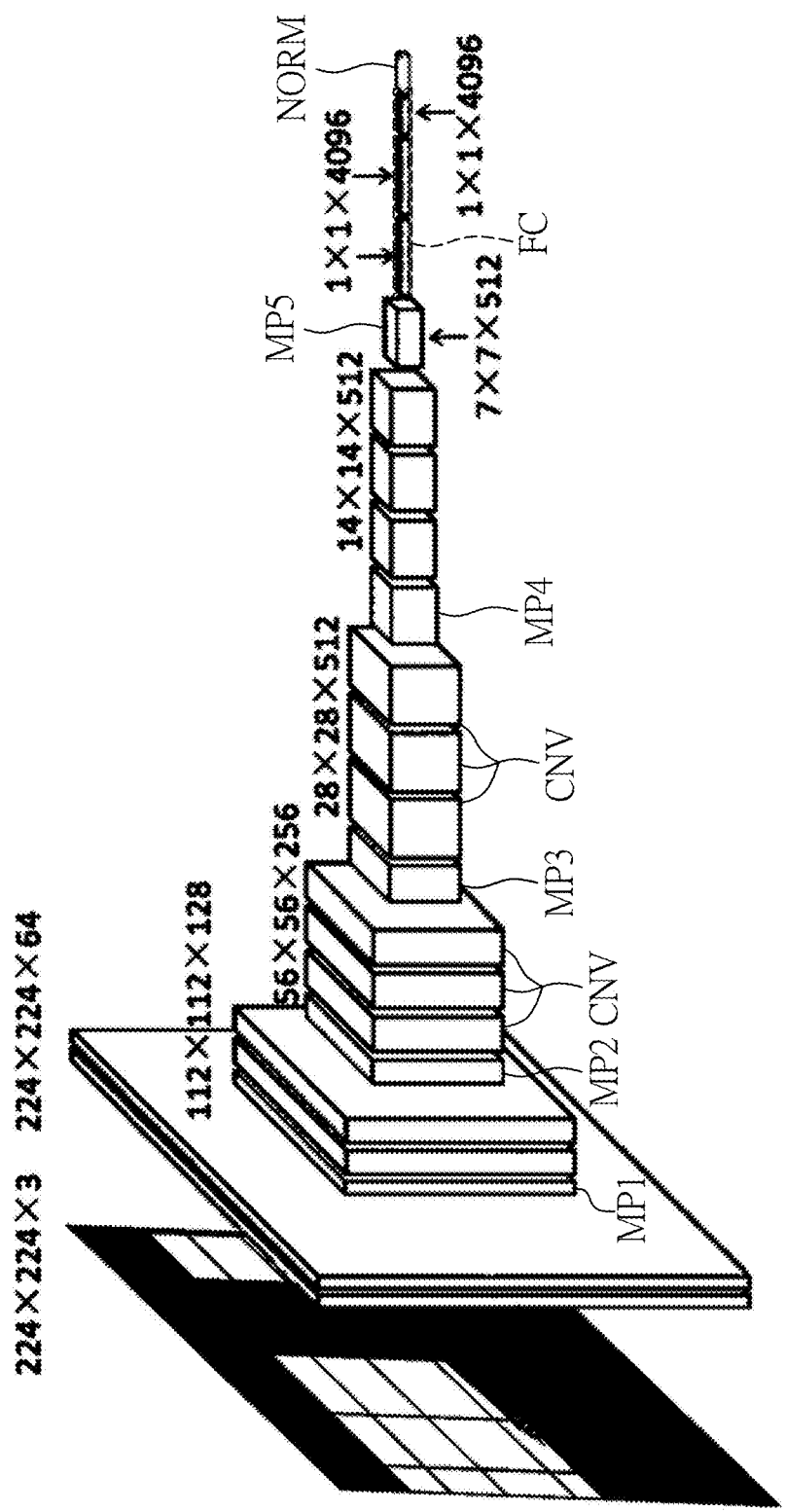
FIG. 3 is a structural diagram of a VGG deep learning network according to an embodiment of the present disclosure.

In detail, the trained deep learning network is a VGG deep learning network, which is a convolutional neural networks (CNN) model. Reference is made to FIG. 3, which is a structural diagram of the VGG deep learning network according to an embodiment of the present disclosure. As shown in FIG. 3, the VGG deep learning network includes a plurality of convolutional layers CNV and a plurality of pooling layers MP1, MP2, MP3, MP4, MP5 that are sequentially iterated for multiple times, a fully connected layer FC, and a normalization function NORM. As shown in FIG. 3, the number of iterations is 5, but the present disclosure is not limited thereto.

The VGG deep learning network used in the embodiment of the present disclosure is a model pre-trained by ImageNet data set. Therefore, there is no need to perform any training on the virtual images generated by the BIM model, and weights generated by the VGG deep learning network after being trained by the ImageNet data set can be directly utilized. It should be understood that the trained CNN model can have good image retrieval benefits even when being performed with different data sets, and thus can be used as an effective method for similarity matching between BIM images and real images.

During the image feature extractions of the plurality of virtual images, one of the plurality of pooling layers MP1, MP2, MP3, MP4, MP5 needs to be used as a main feature extraction layer, so as to perform the image feature extractions on the plurality of virtual images.

Figure 4:
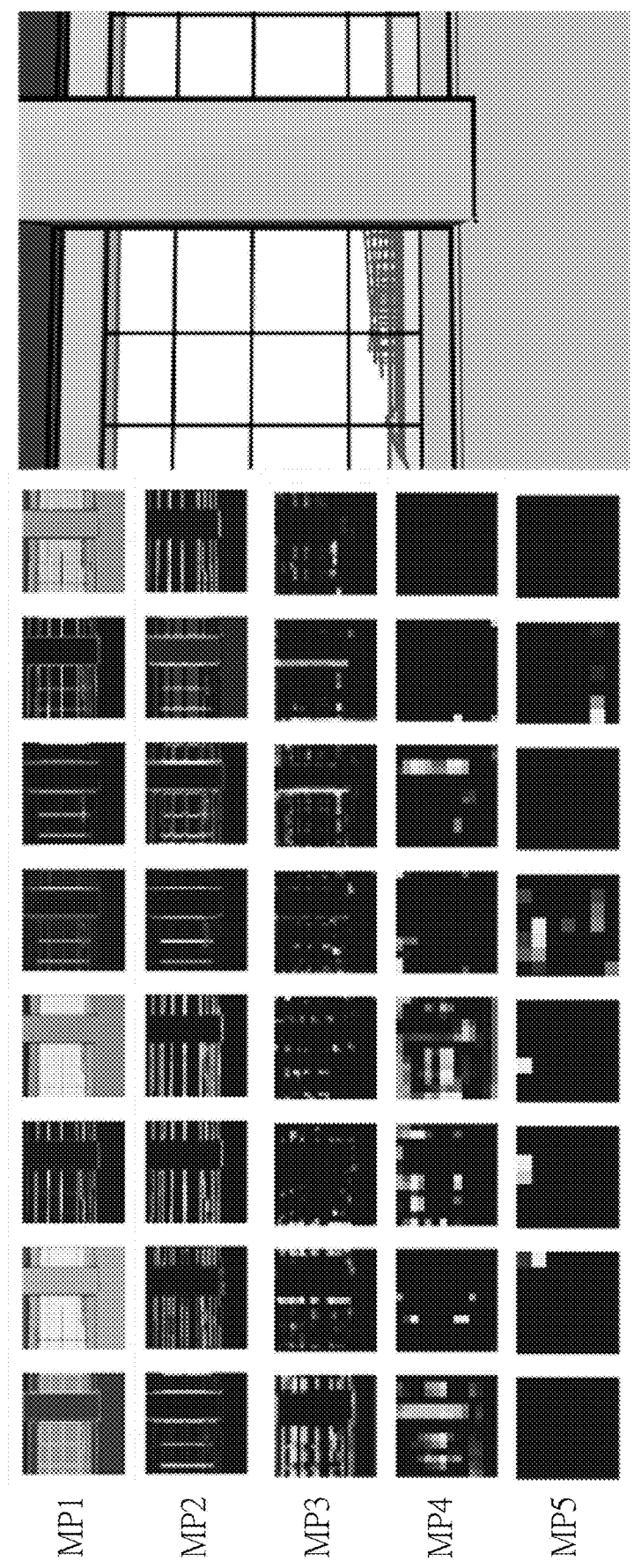
FIG. 4 is a visualization diagram of feature results extracted by all pooling layers according to an embodiment of the present disclosure.

In order to determine the pooling layer to be used, reference can be made to FIG. 4, which is a visualization diagram of feature results extracted by all the pooling layers according to an embodiment of the present disclosure. FIG. 4 is generated by extracting and visualizing the results of the feature extractions of the model rendering images on the right of FIG. 4 by using the pooling layers MP1, MP2, MP3, MP4, and MP5 in the VGG deep learning network, and each pooling layer only visualizes first eight feature extraction results. As shown in FIG. 4, the fourth pooling layer MP4 can correctly treat pillars and windows of the model as important features. However, the third pooling layer MP3 extracts the features of the windows, but loses features of the pillar elements, thereby not conforming to applications in which the construction site structure is regarded as the main feature. The fifth pooling layer MP5 completely loses all features, which is not conducive to feature extraction. While images of the first and second polling layers are large, important features are not actually extracted. If the first and second pooling layers are used for feature matching, there will be too much noise and the features cannot be matched correctly. Therefore, in an exemplary embodiment of the present disclosure, a fourth pooling layer MP4 among the pooling layers MP1, MP2, MP3, MP4, and MP5 is used as the main feature extraction layer.

Therefore, through establishing the image database, a limitation that a real image database cannot be established at the construction site can be overcome. Date formats are shown in the following Table 1. The data is divided into space $R_n$ as a label, and there are a plurality of virtual images $I_n$ in each space. Each virtual image is then used to extract a virtual image feature $F_n$ of the virtual image through VGG, and finally the position and pose $P_n=\{x, y, z, qx, qy, qz, qw\}$ of the virtual camera when each virtual image is generated and is recorded. When creating an image, intrinsic parameters and distortion coefficients of the image capturing device 12 should be taken into consideration, so as to prevent errors caused by different camera intrinsic parameters during the evaluation of the camera position and pose.

TABLE 1

| Spaces | Virtual images | Virtual image features | Camera position and pose parameters of virtual camera |
|---|---|---|---|
| $R_1$ | [$I_1, I_2, I_3, I_4$ . . .] | [$F_1, F_2, F_3, F_4$ . . .] | [$P_1, P_2, P_3, P_4$ . . .] |
| $R_2$ | [$I_1, I_2, I_3, I_4$ . . .] | [$F_1, F_2, F_3, F_4$ . . .] | [$P_1, P_2, P_3, P_4$ . . .] |
| . . . | . . . | . . . | . . . |
| $R_n$ | [$I_1, I_2, I_3, I_4$ . . .] | [$F_1, F_2, F_3, F_4$ . . .] | [$P_1, P_2, P_3, P_4$ . . .] |

Figure 5:
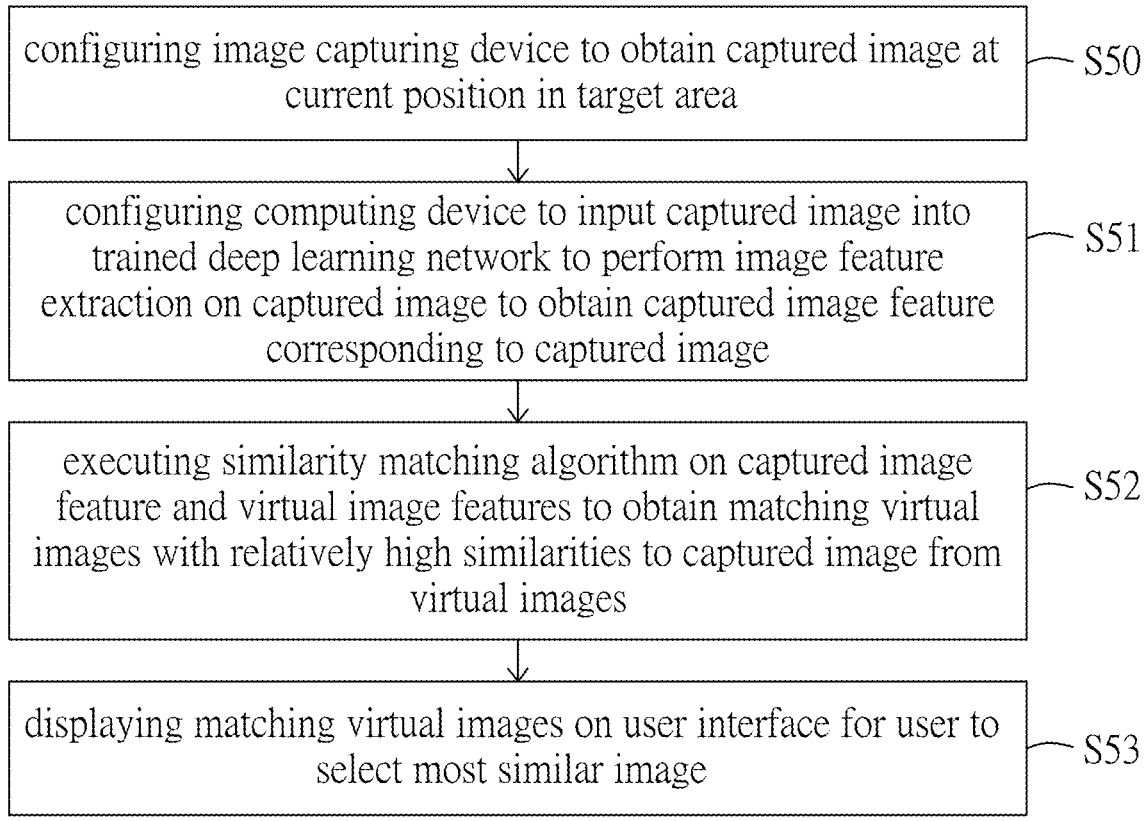
FIG. 5 is a flowchart of steps for performing spatial similarity matching according to an embodiment of the present disclosure.

After the image database is established, the user can shoot images with the image capture device 12 in the target area (for example, a construction site). A similarity calculation method is applied to the captured images and the images in the database to obtain a most similar image, and thereby obtain the spatial information of a position where the captured images are captured. Reference is further made to FIG. 5, which is a flowchart of steps for performing spatial similarity matching according to an embodiment of the present disclosure. As shown in FIG. 5, the steps for performing the spatial similarity matching are as follows:

Step S50: configuring the image capturing device to obtain a captured image at a current position in the target area. The so-called current position is a position to be positioned, and is usually a position where the image capturing device is located. The captured image thus obtained is named $I_q$.

Step S51: configuring the computing device to input the captured image into the trained deep learning network to perform the image feature extraction on the captured image to obtain a captured image feature corresponding to the captured image. In this step, the trained deep learning network is the aforementioned VGG deep learning network, and the obtained image feature is named $F_q$.

Step S52: executing a similarity matching algorithm on the captured image feature and the plurality of virtual image features to obtain a plurality of matching virtual images with relatively high similarities to the captured image from the plurality of virtual images.

In detail, the similarity matching algorithm can be, for example, a cosine similarity matching algorithm, which is used to calculate a plurality of similarities of the plurality of virtual images to the captured images, and the plurality of similarities can be expressed by the following equation:

$$S(F_q, F_n) = \frac{F_q F_n}{|F_q||F_n|};$$

where S is a degree of similarity, and the cosine similarity theorem uses 0 to 1 to indicate the degree of similarity. The closer S is to 1, the higher the degree of similarity is. $F_n$ represents the virtual image feature $F_n$ extracted from the nth virtual image $I_n$ through the VGG deep learning network.

After the virtual image with the highest degree of similarity is matched and obtained, in order to solve design issues related to repetitiveness and symmetry of the building, a correct image is manually selected from the plurality of matched virtual images with relatively higher similarities.

Step S53: displaying the plurality of matching virtual images on the user interface for the user to select a most similar image.

Figure 6A:
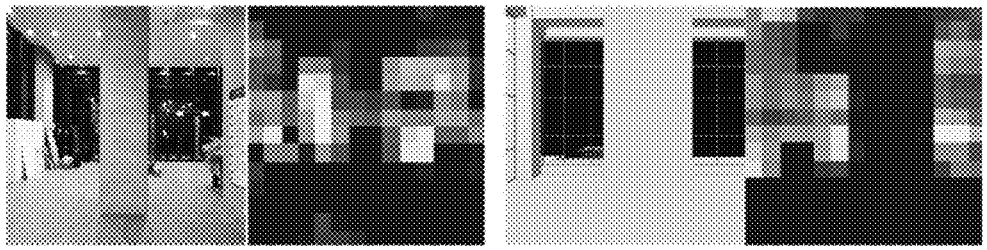
FIGS. 6(a) to 6(c) respectively show multiple examples of captured images, captured image feature maps, virtual images, and virtual image feature maps from left to right.
Figure 6B:
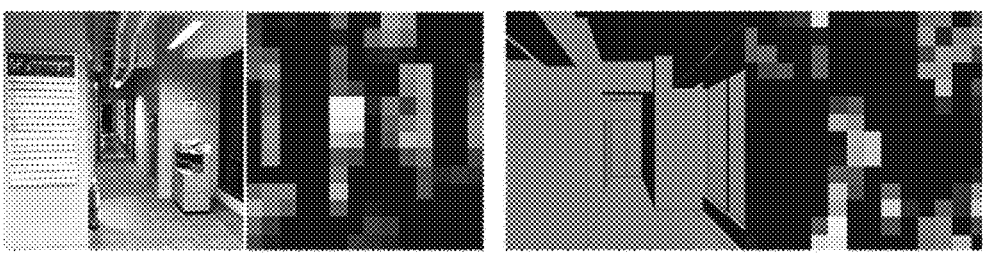
Figure 6C:
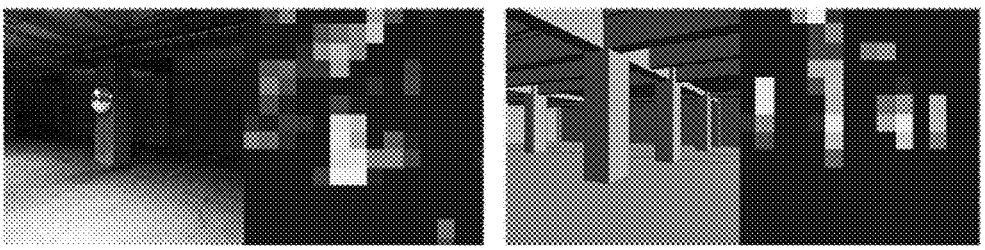

FIGS. 6(a) to 6(c) respectively show multiple examples of captured images, captured image feature maps, virtual images, and virtual image feature maps from left to right according to the embodiment of the present disclosure.

From FIG. 6(a) to FIG. 6(c), it can be seen that after visualizing the features extracted by the VGG deep learning network, important feature blocks can be displayed. For example, FIG. 6(a) shows that floor windows on left and right sides are the important feature blocks, FIG. 6(b) shows that a middle block of a corridor is the important feature block, and FIG. 6(c) shows that pillars are the important feature blocks. Matching results show that the VGG deep learning network can indeed extract important features without any additional training performed on the plurality of virtual images extracted from the BIM model. If a specific block is extracted from the feature map, it can be clearly seen that a distribution of similar images is very similar to a distribution of query images.

Figure 7:
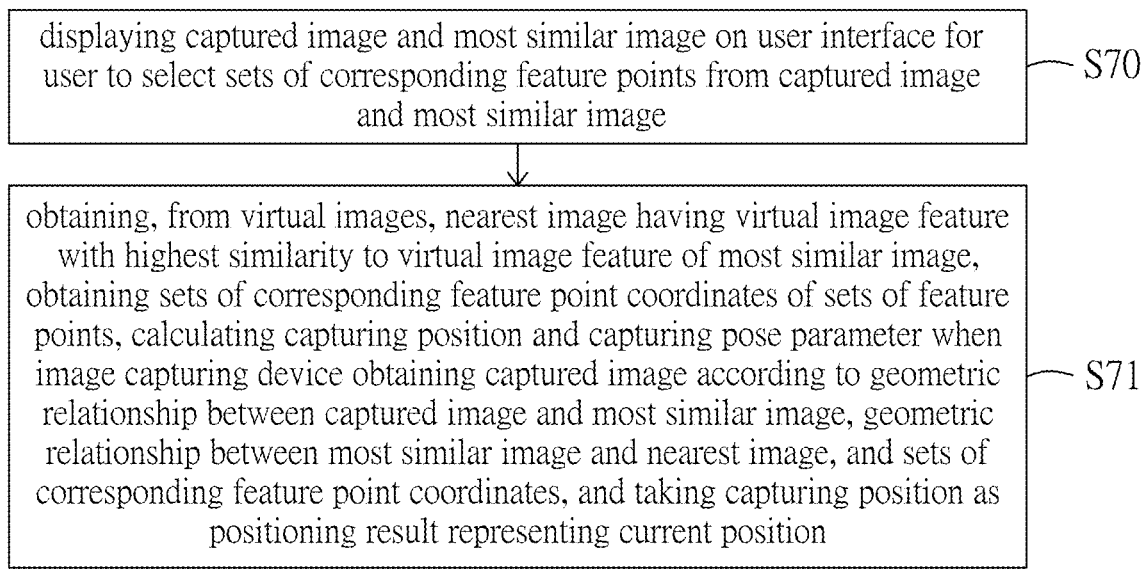
FIG. 7 is a flowchart of steps for performing camera position and pose evaluation according to an embodiment of the present disclosure.

After the most similar image is successfully matched, the present disclosure can utilize the most similar image to evaluate the position and the pose of the image capturing device 12 when the captured image is taken. Reference is further made to FIG. 7, which is a flowchart of steps for performing camera position and pose evaluation according to an embodiment of the present disclosure.

As shown in FIG. 7, the steps for performing camera position and pose evaluation include:

Step S70: displaying the captured image and the most similar image on the user interface for the user to select a plurality of sets of corresponding feature points from the captured image and the most similar image.

In detail, the principle used to evaluate the position and pose of the camera is a geometric relationship between the two images. For example, an epipolar geometry relationship can be described by a fundamental matrix, and an epipolar constraint can be used to derive the following definition of the fundamental matrix F:

$$F = K'^{-T} T R K^{-1};$$

where F is the fundamental matrix, K is an intrinsic parameter matrix of one camera capturing a first image, K' is an internal parameter matrix of another camera capturing a second image, T is a movement vector matrix of the two cameras, and R is a rotation matrix of the two cameras.

Values of the fundamental matrix are completely defined by the intrinsic parameters K and K' of the two cameras and external parameters (R, T) between the two cameras. In other words, when information of three-dimensional objects appearing in the captured image is unknown, the fundamental matrix can be calculated from the pairwise feature points of the two images to obtain (R, T) and calculate a movement of the camera.

The fundamental matrix can be calculated from multiple pairwise corresponding feature points that are known in the two images. In the embodiment of the present disclosure, the fundamental matrix can be obtained, for example, by using eight-point algorithm, and thus more than eight sets of corresponding feature points should be obtained from the captured image and the most similar image. Therefore, in step S70, a manual matching method is adopted. The user only needs to manually match eight feature points. In this way, the fundamental matrix can be calculated, and the camera external parameters (R, T) associated with the movement from the most similar image to the captured image can be obtained.

Step S71: obtaining, from the plurality of virtual images, a nearest image having the virtual image feature with the highest similarity to the virtual image feature of the most similar image, obtaining a plurality of sets of corresponding feature point coordinates of the plurality of sets of feature points, calculating a capturing position and a capturing pose parameter when the image capturing device obtaining the captured image according to a geometric relationship between the captured image and the most similar image, a geometric relationship between the most similar image and the nearest image, and the plurality of sets of corresponding feature point coordinates, and taking the capturing position as a positioning result representing the current position.

Figure 8:
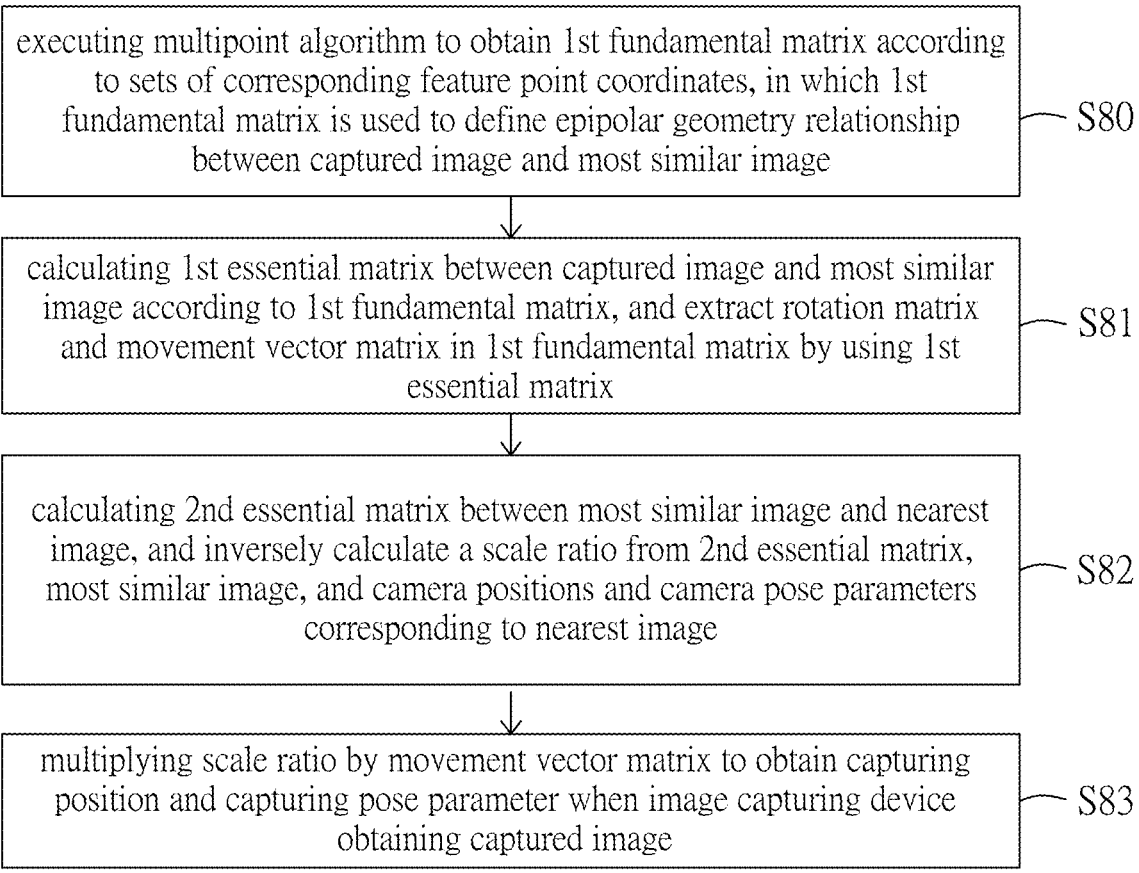
FIG. 8 is a flowchart of steps for calculating geometric relationships of a most similar image, the captured image, and a nearest image according to an embodiment of the present disclosure.

Reference can be further made to FIG. 8, which is a flowchart of steps for calculating geometric relationships of the most similar image, the captured image, and the nearest image according to an embodiment of the present disclosure. In detail, the computing device 10 can be further configured to perform the following steps.

Step S80: executing a multipoint algorithm to obtain the first fundamental matrix according to the plurality of sets of corresponding feature point coordinates, in which the first fundamental matrix is used to define an epipolar geometry relationship between the captured image and the most similar image.

After the eight feature points are obtained, the basic matrix can be obtained by using the eight-point algorithm, assuming:

$$x = \begin{bmatrix} u \\ v \\ 1 \end{bmatrix}, x' = \begin{bmatrix} u' \\ v' \\ 1 \end{bmatrix} \text{ and } F = \begin{bmatrix} f_{11} & f_{12} & f_{13} \\ f_{21} & f_{22} & f_{23} \\ f_{31} & f_{32} & f_{33} \end{bmatrix};$$

where x, x' are pixel coordinates of the feature points, and F is the fundamental matrix. When these definitions are substituted into the epipolar constraint, the following equation can be obtained after expansion:

$$uu'f_{11}+vu'f_{12}+u'f_{13}+uv'f_{21}+vv'f_{22}+v'f_{23}+uf_{31}+vf_{32}+f_{33}=0.$$

All $f_{ij}$ are unknowns, but the right side of the equal sign is 0, which is a homogenous linear equation. This allows the equation to have an infinite number of solutions. In order to eliminate this scaling degree of freedom, it is assumed that a certain unknown number $f_{ij}$ is a constant. Generally, it is assumed that $f_{33}$ is −1 when calculating the fundamental matrix, and $f_{33}$ as −1 is substituted in to obtain the following equation:

$$uu'f_{11}+vu'f_{12}+u'f_{13}+uv'f_{21}+vv'f_{22}+v'f_{23}+uf_{31}+vf_{32}=1.$$

The eight corresponding feature points are further substituted into the above equation, and a non-homogeneous linear system can then be obtained:

$$\begin{bmatrix} u_1u'_1 & v_1u'_1 & u'_1 & u_1v'_1 & v_1v'_1 & v'_1 & u_1 & v_1 \\ u_2u'_2 & v_2u'_2 & u'_2 & u_2v'_2 & v_2v'_2 & v'_2 & u_2 & v_2 \\ \vdots & \vdots & \vdots & \vdots & \vdots & \vdots & \vdots & \vdots \\ u_7u'_7 & v_7u'_7 & u'_7 & u_7v'_7 & v_7v'_7 & v'_7 & u_7 & v_8 \\ u_8u'_8 & v_8u'_8 & u'_8 & u_8v'_8 & v_8v'_8 & v'_8 & u_8 & v_8 \end{bmatrix} \begin{bmatrix} f_{11} \\ f_{12} \\ f_{13} \\ f_{21} \\ f_{22} \\ f_{23} \\ f_{31} \\ f_{32} \end{bmatrix} = 1.$$

Finally, the eight equations are solved to obtain the first fundamental matrix described in the step S80.

Step S81: calculating a first essential matrix between the captured image and the most similar image according to the first fundamental matrix, and extract a rotation matrix and a movement vector matrix in the fundamental matrix by using the first essential matrix.

An essential matrix is actually the fundamental matrix after the camera is calibrated. Therefore, when the intrinsic parameters of the camera are completely eliminated, only two external camera parameters (R, T) are left. In order to separately extract the rotation matrix and the movement vector matrix (R, T) in the fundamental matrix, a singular value decomposition (SVD) technique must be used. Finally, R and T are extracted from a 3×3 matrix. It should be noted that the embodiment of the present disclosure has already mentioned the need to set the intrinsic parameters of the camera to be consistent with the intrinsic parameters of the image capturing device 10 used to obtain the captured image during the aforementioned image database establishment stage. Therefore, the essential matrix can be used directly, which can be expressed by the following equation:

$$E=K'^T FK=TR.$$

Step S82: calculating a second essential matrix between the most similar image and the nearest image, and inversely inference a scale ratio from the second essential matrix, the most similar image, and the plurality of camera positions and the camera pose parameters corresponding to the nearest image.

After obtaining a rotation matrix $R_{1q}$ and a movement vector matrix $T_{1q}$, since $f_{33}$ is assumed to be −1, there is a scaling ratio s in the solution, and thus there is a scaling factor of s in T1q. In other words, it is necessary to further obtain the nearest image ($I_2$) with the highest similarity to the virtual image feature of the most similar image ($I_1$) from step S71, and compare, after an essential matrix $E_{12}$ of the nearest image ($I_2$) is calculated, the camera position and pose parameters recorded in the established image database (referring to Table 1). Then, a value of the scale ratio s can be inversely calculated.

First, a conversion matrix $M_{12}$ from $I_1$ to $I_2$ is calculated according to known values:

$$M_{12} = \begin{bmatrix} R_{12} & T_{12} \\ 0 & 1 \end{bmatrix} = inv(M_1)M_2.$$

Then, an ORB feature description algorithm is used to match the feature points of $I_1$ and $I_2$. After the feature points are obtained, the essential matrix $E_{12}$ can be calculated and $(R'_{12}, T'_{12})$ is obtained, which is expressed as the conversion matrix $M'_{12}$:

$$M'_{12} = \begin{bmatrix} R'_{12} & T'_{12} \\ 0 & 1 \end{bmatrix}.$$

It can be further obtained that:

$T_{12} = sT'_{12}.$

Step S83: multiplying the scale ratio by the movement vector matrix to obtain the capturing position and the capturing pose parameter when the image capturing device obtaining the captured image.

Therefore, after the capturing position and the capturing pose parameter of the image capturing device when obtaining the captured image are obtained, the capturing position can be used as a positioning result representing the current position.

Therefore, the above steps (a) to (c) can eliminate the limitation that a real image database cannot be established at the construction site, and import semi-automatic methods when using feature extraction methods based on deep learning models, to allow users to select the correct similar images, to provide solutions for a situation in which a position cannot be determined due to repetitive and symmetrical structures. In addition, the users are allowed to manually match the plurality of feature points of the plurality of virtual image and the captured image filtered by the deep learning network, such that accurate positioning can be achieved.

The present disclosure further introduces a concept of simultaneous localization and mapping (SLAM) to avoid excessive manual positioning assistance. After the positioning is completed in the first three steps, the starting point information is provided to the user, and then the Visual-Inertial Odometry (VIO) is used to calculate a relative position. In addition, due to an error of the VIO, the BIM model is template matched for instant correction to address an issue of accumulated errors.

More specifically, after the camera position and pose evaluation is performed, considering that a continuous positioning function is required in the construction site, if only the aforementioned steps are used to position each captured image, there will be an excessive number of manual interventions, which results in poor efficiency. Therefore, in the present disclosure, the concept of SLAM is introduced, and the position and pose of the camera after positioning in the previous steps are taken as a starting point of SLAM. Then, relative displacement positioning calculations are subsequently achieved through synchronous positioning and map establishment, thereby reducing the number of manual interventions.

Figure 9:
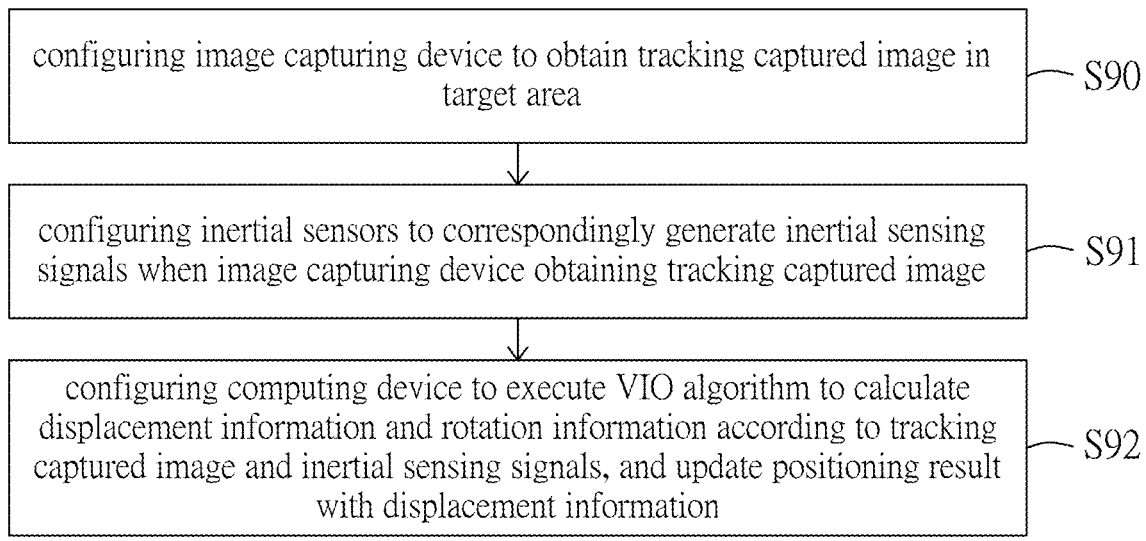
FIG. 9 is a flowchart of steps for executing a visual inertial odometer according to an embodiment of the present disclosure.

Reference can be further made to FIG. 9, which is a flowchart of steps for executing a visual inertial odometer (VIO) according to an embodiment of the present disclosure. As shown in FIG. 9, the steps for executing the VIO are as follows.

Step S90: configuring the image capturing device to obtain a tracking captured image in the target area.

Step S91: configuring a plurality of inertial sensors to correspondingly generate a plurality of inertial sensing signals when the image capturing device obtaining the tracking captured image.

For example, a mobile device with a camera, a gyroscope, and an acceleration sensor can be used. The camera is used to obtain the tracking captured image (that is, a captured image for position and pose tracking after an initial positioning), the gyroscope is used to obtain three-axis rotation and angular acceleration of the mobile device to estimate the rotation pose of the mobile device, and the acceleration sensor is used to collect three-dimensional acceleration and a moving distance of the mobile device.

Step S92: configuring the computing device to execute a VIO algorithm to calculate displacement information and rotation information according to the tracking captured image and the plurality of inertial sensing signals, and update the positioning result with the displacement information.

Figure 10:
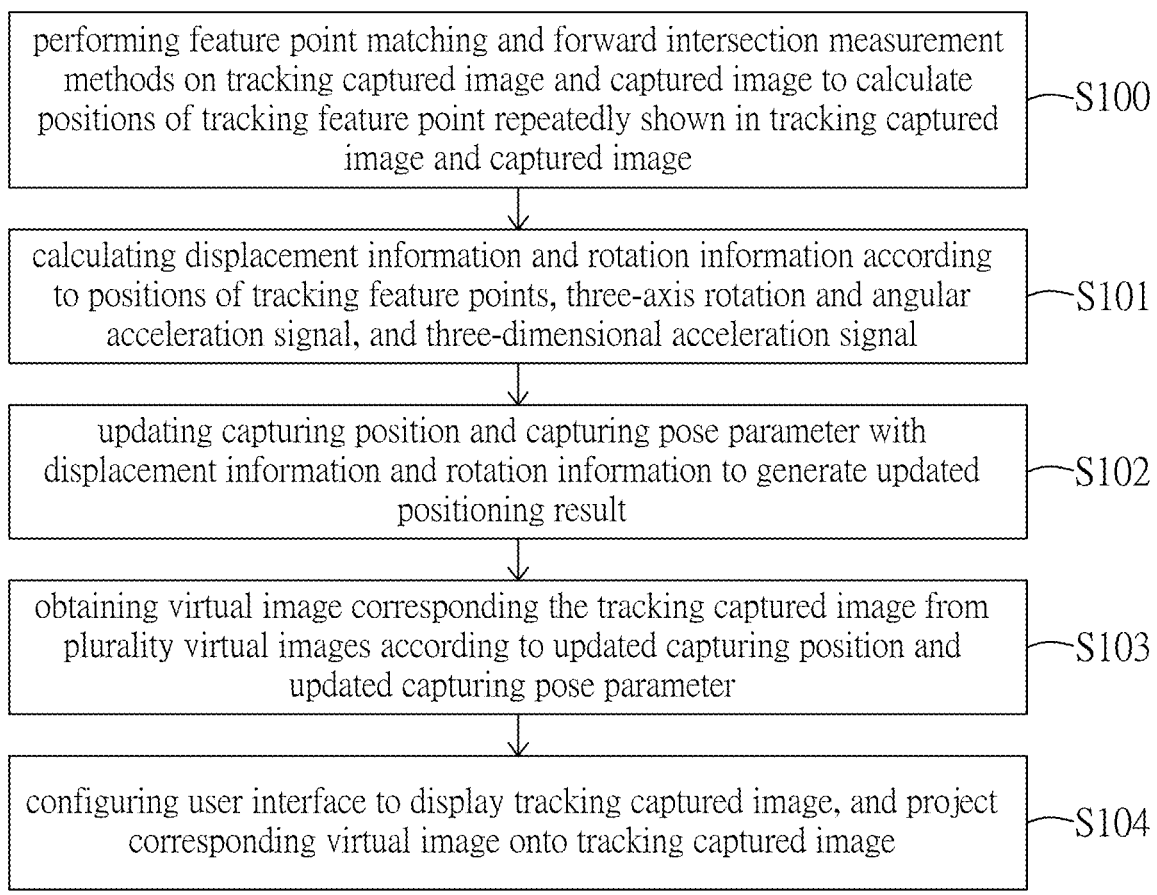
FIG. 10 is a flowchart of a visual inertial odometry algorithm according to an embodiment of the present disclosure.

In detail, reference is made to FIG. 10, which is a flowchart of a visual inertial odometry algorithm according to an embodiment of the present disclosure. As shown in FIG. 10, the VIO algorithm includes the following steps.

Step S100: performing feature point matching and forward intersection measurement methods on the tracking captured image and the captured image to calculate positions of a plurality of tracking feature points repeatedly shown in the tracking captured image and the captured image.

Step S101: calculating the displacement information and the rotation information according to the positions of the tracking feature points, the three-axis rotation and angular acceleration signal, and the three-dimensional acceleration signal.

Step S102: updating the capturing position and the capturing pose parameter with the displacement information and the rotation information to generate the updated positioning result.

Step S103: obtaining the virtual image corresponding to the tracking captured image from the plurality virtual images according to the updated capturing position and the updated capturing pose parameter.

Step S104: configuring the user interface to display the tracking captured image, and project the corresponding virtual image onto the tracking captured image.

The concept of the visual inertial odometer is to obtain images, angular acceleration, three-dimensional acceleration and other data with time series through multiple sensors, and calculate a displacement and a rotation of the device to achieve continuous positioning. The overall process is shown in FIG. 10. After obtaining the image data, the positions of the feature points that are repeatedly observed in the two images are calculated through the feature point matching in computer vision and the forward intersection measurement method. Then, the updated positioning result can be obtained by using the angular acceleration and movement collected by the gyroscope and the acceleration sensor to infer the displacement and rotation of the mobile device.

Figure 11:
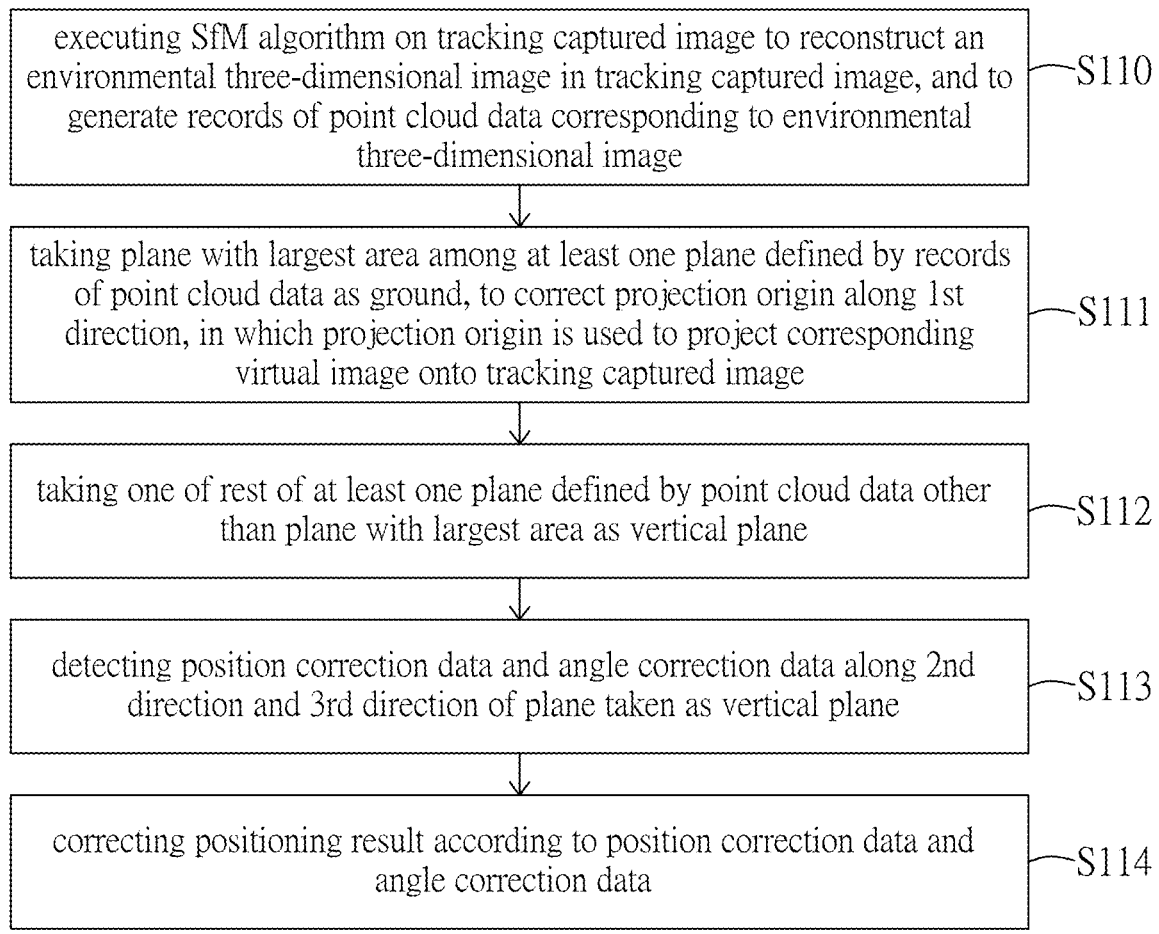
FIG. 11 is a flowchart of a positioning correction process according to an embodiment of the present disclosure.

The present disclosure further provides a positioning correction process for correcting observation errors generated in the calculation process of the above-mentioned VIO algorithm. FIG. 11 is a flowchart of a positioning correction process according to an embodiment of the present disclosure. As shown in FIG. 11, the positioning correction process includes configuring the computing device to perform the following steps.

Step S110: executing a structure from motion (SfM) algorithm on the tracking captured image to reconstruct an environmental three-dimensional image in the tracking captured image, and to generate a plurality of records of point cloud data corresponding to the environmental three-dimensional image. The plurality of records of point cloud data have at least one plane defined according to characteristic relationships of the plurality of records of point cloud data. For example, these records of point cloud data can be defined as a plane according to their geometry and characteristic relationships. For example, a certain characteristic point constantly appears in the point cloud data, and these points form a coplanar plane in a three-dimensional space, which can be recognized as a plane.

Figure 12:
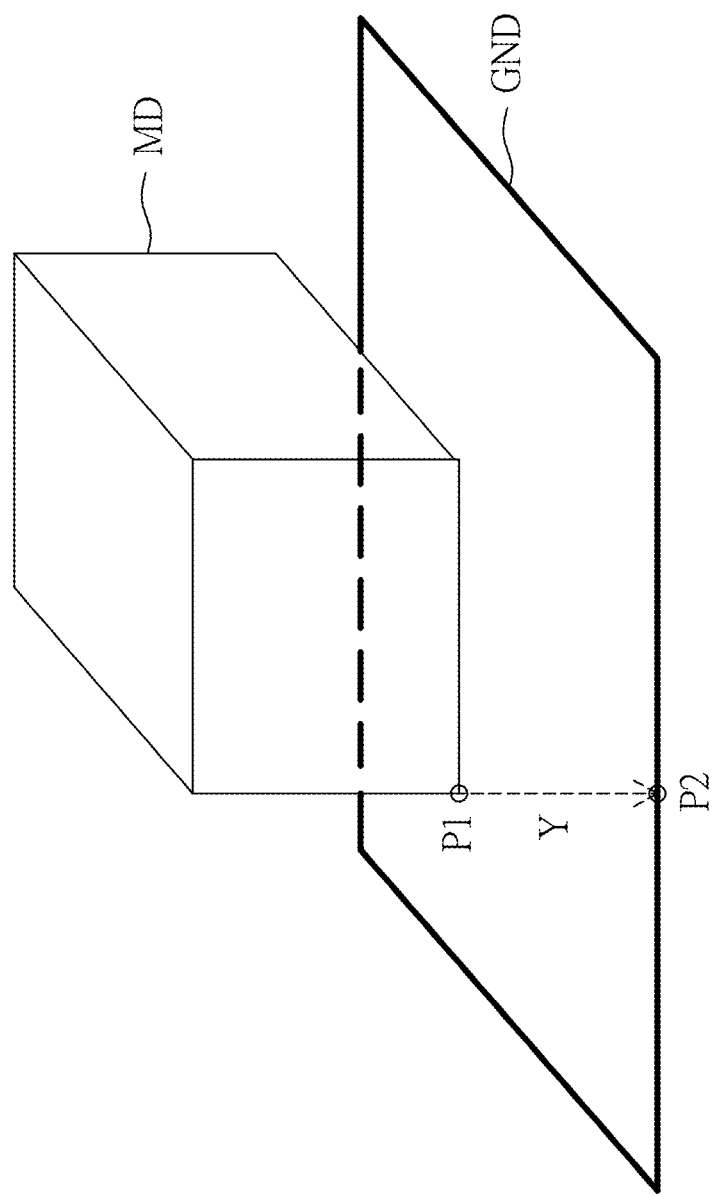
FIG. 12 is a conceptual diagram of correcting a projection model in Y direction by a detected horizontal plane according to an embodiment of the present disclosure.

Step S111: taking the plane with the largest area among the at least one plane defined by the plurality of records of point cloud data as a ground, to correct a projection origin along a first direction, in which the projection origin is used to project the corresponding virtual image onto the tracking captured image. For example, reference can be made to FIG. 12, which is a conceptual diagram of correcting a projection model in Y direction by a detected horizontal plane according to an embodiment of the present disclosure. In this embodiment, a horizontal plane that is detected to have the largest area belongs to a ground GND of the target area (construction site), and a projection origin P2 of a projection model MD is corrected to a projection origin P1 along the Y direction, so as to be at the same height as the ground GND. Therefore, a coordinate value of the projection model MD in the Y direction can be continuously corrected to the detected ground GND.

Step S112: taking one of the rest of the at least one plane defined by the point cloud data other than the plane with the largest area as a vertical plane.

Step S113: detecting position correction data and angle correction data along a second direction and a third direction of the plane taken as the vertical plane.

Step S114: correcting the positioning result according to the position correction data and the angle correction data.

In detail, in the above steps, the present disclosure further uses a detected vertical plane to calibrate X-direction coordinate, Z-direction coordinate and yaw (Z axis yaw angle) of the projection model. The overall concept is illustrated by using pillar elements and model pillars in the target area as an example. Reference is made to FIGS. 13(a) to 13(d), which are schematic diagrams in which the pillar elements and the model pillars in the target area are used to demonstrate correction of the projection model by use of the detected vertical plane according to an embodiment of the present disclosure. FIG. 13 (a) shows that the model pillar has caused X, Z direction and yaw angle errors due to observation errors, and a thick line segment is the vertical plane detected by the pillar element in the tracking captured image. This vertical plane can then be used as a reference to correct the Z direction and the rotation correction yaw angle of the model pillar, as shown in FIG. 13(b). FIG. 13(c) shows that there is still an error in the X direction. At this time, the thick line segment is also the vertical plane corresponding to the pillar element. The vertical plane is also used as the basis for X correction, and finally the positioning correction is completed, as shown in FIG. 13(d).

Therefore, the indoor positioning method and the indoor positioning system of the present disclosure introduce the concept of simultaneous localization and mapping (SLAM) to avoid excessive manual positioning assistance. After the positioning is completed in the first three steps, the starting point information is provided to the user, and then the visual-inertial odometry (VIO) is used to calculate a relative position. In addition, due to an error of the VIO, the BIM model is template matched for instant correction, so as to address the issue of accumulated errors.

It should be noted that although the construction site is used as the target area in the above embodiments, the indoor positioning method and the indoor positioning system of the present disclosure are substantially applicable to any indoor area, and a scope and a location suitable for application of said indoor positioning method and indoor positioning system are not limited in the present disclosure.

In conclusion, the indoor positioning method and the indoor positioning system provided by the present disclosure can overcome a limitation that a real image database cannot be established at the construction site, and import semi-automatic methods when using feature extraction methods based on deep learning models, so as to allow the users to select the correct similar image. In this way, a situation in which a position cannot be determined due to repetitive and symmetrical structures can be solved. In addition, the users are enabled to manually match the plurality of feature points from the plurality of virtual images and the captured image that are filtered by the deep learning network, such that accurate positioning can be achieved.

Furthermore, the indoor positioning method and the indoor positioning system of the present disclosure further introduce a concept of simultaneous localization and mapping (SLAM) to avoid excessive manual positioning assistance. After the positioning is completed in the first three steps, a starting point information is provided to the user, and then a visual-inertial odometry (VIO) is used to calculate a relative position. In addition, due to an error of the VIO, the BIM model is template matched for instant correction, so as to address an issue of accumulated errors.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. An indoor positioning method, comprising:
configuring a computing device to obtain a building information modeling (BIM) model of a target area;
configuring the computing device to generate at least one virtual camera, control the at least one virtual camera to obtain a plurality of virtual images in the BIM model, and a plurality of camera positions and a plurality of camera pose parameters corresponding to the plurality of virtual images, and store the plurality of virtual images, the plurality of camera positions and the plurality of camera pose parameters in an image database;
configuring the computing device to input the plurality of virtual images into a trained deep learning network, so as to perform image feature extractions on the plurality of virtual images and to obtain a plurality of virtual image features corresponding to the plurality of virtual images;
configuring an image capturing device to obtain a captured image at a current position in the target area;
configuring the computing device to input the captured image into the trained deep learning network, so as to perform the image feature extraction on the captured image and to obtain a captured image feature corresponding to the captured image;

configuring the computing device to execute a similarity matching algorithm on the captured image feature and the plurality of virtual image features, so as to obtain a plurality of matching virtual images with relatively high similarity to the captured image from the plurality of virtual images;

configuring the computing device to display the plurality of matching virtual images on a user interface for a user to select a most similar image;

configuring the computing device to display the captured image and the most similar image on the user interface for the user to select a plurality of sets of corresponding feature points from the captured image and the most similar image; and configuring the computing device to:
  obtain, from the plurality of virtual images, a nearest image having the virtual image feature with the highest similarity to the virtual image feature of the most similar image;
  obtain a plurality of sets of corresponding feature point coordinates of the plurality of sets of feature points;
  calculate a capturing position and a capturing pose parameter of the image capturing device upon obtaining the captured image according to a geometric relationship between the captured image and the most similar image, a geometric relationship between the most similar image and the nearest image, and the plurality of sets of corresponding feature point coordinates;
  take the capturing position as a positioning result representing the current position;
  execute a multipoint algorithm to obtain a first fundamental matrix according to the plurality of sets of corresponding feature point coordinates, wherein the first fundamental matrix is used to define an epipolar geometry relationship between the captured image and the most similar image;
  calculate a first essential matrix between the captured image and the most similar image according to the first fundamental matrix, and extract a rotation matrix and a movement vector matrix in the first fundamental matrix by using the first essential matrix;
  calculate a second essential matrix between the most similar image and the nearest image, and inversely calculate a scale ratio from the second essential matrix, the most similar image, and the plurality of camera positions and the plurality of camera pose parameters corresponding to the nearest image; and
  multiply the scale ratio by the movement vector matrix, so as to obtain the capturing position and the capturing pose parameter of the image capturing device upon obtaining the captured image.

2. The indoor positioning method according to claim 1, further comprising:
  configuring the image capturing device to obtain a tracking captured image in the target area;
  configuring a plurality of inertial sensors to correspondingly generate a plurality of inertial sensing signals when the image capturing device obtains the tracking captured image; and
  configuring the computing device to execute a visual inertial odometry (VIO) algorithm to calculate displacement information and rotation information according to the tracking captured image and the plurality of inertial sensing signals, and update the positioning result with the displacement information.

3. The indoor positioning method according to claim 2, wherein the plurality of inertial sensors include a gyroscope and an accelerometer, and the plurality of inertial sensing signals include a three-axis rotation and angular acceleration signal and a three-dimensional acceleration signal, and the VIO algorithm includes:
  performing feature point matching and forward intersection measurement methods on the tracking captured image and the captured image to calculate positions of a plurality of tracking feature points repeatedly shown in the tracking captured image and the captured image;
  calculating the displacement information and the rotation information according to the positions of the tracking feature points, the three-axis rotation and angular acceleration signal, and the three-dimensional acceleration signal;
  updating the capturing position and the capturing pose parameter according to the displacement information and the rotation information, so as to generate the updated positioning result;
  obtaining the virtual image corresponding to the tracking captured image from the plurality virtual images according to the updated capturing position and the updated capturing pose parameter; and
  configuring the user interface to display the tracking captured image, and project the corresponding virtual image onto the tracking captured image.

4. The indoor positioning method according to claim 3, further comprising:
  configuring the computing device to execute a structure from motion (SfM) algorithm on the tracking captured image, so as to reconstruct an environmental three-dimensional image in the tracking captured image, and to generate a plurality of records of point cloud data corresponding to the environmental three-dimensional image, wherein the plurality of records of point cloud data have at least one plane defined according to characteristic relationships of the plurality of records of point cloud data; and
  configuring the computing device to take one of the at least one plane defined by the plurality of records of point cloud data which has a largest area as a ground, so as to correct a projection origin along a first direction, wherein the projection origin is used to project the corresponding virtual image onto the tracking captured image.

5. The indoor positioning method according to claim 4, further comprising:
  configuring the computing device to take another one of the at least one plane other than the one of the at least one plane having the largest area as a vertical plane;
  configuring the computing device to detect position correction data and angle correction data along a second direction and a third direction of the plane taken as the vertical plane; and
  configuring the computing device to correct the positioning result according to the position correction data and the angle correction data.

6. The indoor positioning method according to claim 1, wherein the trained deep learning network is a VGG deep learning network pre-trained by an ImageNet data set, and the VGG deep learning network includes a plurality of convolutional layers and a plurality of pooling layers that are sequentially iterated for multiple times, a fully connected layer and a normalization function;
  wherein the step of performing the image feature extractions on the plurality of virtual images to obtain the plurality of virtual image features corresponding to the plurality of virtual images further includes using one of the plurality of pooling layers as a main feature extraction layer to perform the image feature extractions on the plurality of virtual images.

7. The indoor positioning method according to claim 6, wherein a number of iterations in the VGG deep learning network is 5, and a fourth pooling layer of the plurality of pooling layers is used as the main feature extraction layer.

8. The indoor positioning method according to claim 1, wherein the similarity matching algorithm further includes using a cosine similarity matching algorithm to calculate a plurality of similarities of the plurality of virtual images that correspond to the captured image.

9. An indoor positioning system, comprising:
a computing device including at least one processor and a storage unit, wherein the computing device is configured to:
obtain a building information modeling (BIM) model of a target area;
generate at least one virtual camera, and control the at least one virtual camera to obtain a plurality of virtual images in the BIM model, a plurality of camera positions and a plurality of camera pose parameters corresponding to the plurality of virtual images, and store the plurality of virtual images, the plurality of camera positions and the plurality of camera pose parameters in an image database; and
input the plurality of virtual images into a trained deep learning network, so as to perform image feature extractions on the plurality of virtual images and to obtain a plurality of virtual image features corresponding to the plurality of virtual images;
an image capturing device electrically connected to the computing device and configured to obtain a captured image at a current position in the target area; and
a user interface electrically connected to the computing device;
wherein the computing device is further configured to:
input the captured image into the trained deep learning network, so as to perform the image feature extraction on the captured image and to obtain a captured image feature corresponding to the captured image;
execute a similarity matching algorithm on the captured image feature and the plurality of virtual image features to obtain a plurality of matching virtual images with relatively high similarities to the captured image from the plurality of virtual images;
display the plurality of matching virtual images on the user interface for a user to select a most similar image;
display the captured image and the most similar image on the user interface for the user to select a plurality of sets of corresponding feature points from the captured image and the most similar image;
obtain, from the plurality of virtual images, a nearest image having the virtual image feature with the highest similarity to the virtual image feature of the most similar image;
obtain a plurality of sets of corresponding feature point coordinates of the plurality of sets of feature points;
calculate a capturing position and a capturing pose parameter of the image capturing device upon obtaining the captured image according to a geometric relationship between the captured image and the most similar image, a geometric relationship between the most similar image and the nearest image, and the plurality of sets of corresponding feature point coordinates; and
take the capturing position as a positioning result representing the current position;
execute a multipoint algorithm to obtain a first fundamental matrix according to the plurality of sets of corresponding feature point coordinates, wherein the first fundamental matrix is used to define an epipolar geometry relationship between the captured image and the most similar image;
calculate a first essential matrix between the captured image and the most similar image according to the first fundamental matrix, and extract a rotation matrix and a movement vector matrix in the first fundamental matrix by using the first essential matrix;
calculate a second essential matrix between the most similar image and the nearest image, and inversely calculate a scale ratio from the second essential matrix, the most similar image, and the plurality of camera positions and the plurality of camera pose parameters corresponding to the nearest image; and
multiply the scale ratio by the movement vector matrix, so as to obtain the capturing position and the capturing pose parameter of the image capturing device upon obtaining the captured image.

* * * * *